United States Patent
Neumayr et al.

(10) Patent No.: US 11,446,772 B2
(45) Date of Patent: Sep. 20, 2022

(54) APPARATUS FOR REPAIRING A METAL SHEET METHOD OF OPERATING THE SAME, AND METHOD OF REPAIRING A METAL SHEET

(71) Applicant: IPCO SWEDEN AB, Sandviken (SE)

(72) Inventors: Conny-Christian Neumayr, Worgl (AT); Lars Anders Köijer, Gavle (SE)

(73) Assignee: IPCO SWEDEN AB, Sandviken (SE)

( * ) Notice: Subject to any disclaimer, the term of this patent is extended or adjusted under 35 U.S.C. 154(b) by 501 days.

(21) Appl. No.: 16/609,773

(22) PCT Filed: Apr. 27, 2018

(86) PCT No.: PCT/EP2018/060860
§ 371 (c)(1),
(2) Date: Oct. 31, 2019

(87) PCT Pub. No.: WO2018/202575
PCT Pub. Date: Nov. 8, 2018

(65) Prior Publication Data
US 2020/0061754 A1   Feb. 27, 2020

Related U.S. Application Data

(60) Provisional application No. 62/492,972, filed on May 2, 2017.

(51) Int. Cl.
*B23K 37/00* (2006.01)
*B23K 28/02* (2014.01)
(Continued)

(52) U.S. Cl.
CPC ............ *B23K 28/02* (2013.01); *B23K 37/027* (2013.01); *B23K 37/0241* (2013.01);
(Continued)

(58) Field of Classification Search
CPC .......................... B23K 28/02; B23K 37/0241; B23K 37/0264; B23K 37/027; B23K 37/0282;
(Continued)

(56) References Cited

U.S. PATENT DOCUMENTS 2,269,505 A * 1/1942 Anderson .............. B23K 7/107
266/70
3,188,069 A * 6/1965 Chiamparino ......... B23K 7/107
266/70

(Continued)

FOREIGN PATENT DOCUMENTS

JP   H10-100032 A   4/1998
WO   2015119519 A1  8/2015

OTHER PUBLICATIONS

Office Action from corresponding Japanese Application No. 2019-560215 dated Apr. 5, 2022, 3 pages.

(Continued)

Primary Examiner — Kiley S Stoner
(74) Attorney, Agent, or Firm — Tucker Ellis LLP

(57) ABSTRACT

An apparatus for repairing a metal sheet and method of operating the same are provided. The apparatus includes: a base unit including: a frame and an attachment feature on the frame, a cutting unit removably attachable to the base unit to cut out a damaged portion of the metal sheet, and a welding unit removably attachable to the base unit. The cutting unit includes: a cutting arm including a cutting blade, and a motor for operating the cutting arm. The welding unit includes: a fixed platform, a weld movement motor for moving a moveable platform on the fixed platform, and a welding assembly, attached to the moveable platform, to automatically weld a replacement piece to the metal sheet. In operation, the frame is continuously attached to the metal sheet during cutting of the damaged portion and welding of (Continued)

the replacement piece, providing a stable and repeatable frame of reference.

11 Claims, 17 Drawing Sheets

(51) Int. Cl.
    *B23K 37/02*     (2006.01)
    *B23K 37/04*     (2006.01)

(52) U.S. Cl.
    CPC ...... *B23K 37/0264* (2013.01); *B23K 37/0282* (2013.01); *B23K 37/0288* (2013.01); *B23K 37/0408* (2013.01)

(58) Field of Classification Search
    CPC ............ B23K 37/0288; B23K 37/0408; B23K 5/00–24; B23K 7/00–107; B23K 9/00–328; B23K 10/00–027; B23K 37/00–08
    USPC ........................................ 29/402.08; 228/119
    See application file for complete search history.

(56) References Cited

U.S. PATENT DOCUMENTS

| | | | | |
|---|---|---|---|---|
| 3,417,979 A * | 12/1968 | Cable | ...................... | B23K 7/004 266/71 |
| 3,569,658 A * | 3/1971 | Moore | ................ | F04D 29/4286 901/17 |
| 3,614,078 A * | 10/1971 | Hepler | .................. | B23K 7/107 266/70 |
| 3,941,358 A * | 3/1976 | Darling | .................. | B23K 7/107 266/70 |
| 4,448,340 A * | 5/1984 | Lollis | ..................... | B62D 65/00 228/49.1 |
| 4,593,849 A * | 6/1986 | Doering | ................ | B23K 9/048 228/45 |
| 5,443,199 A * | 8/1995 | Krumszyn | ........... | B23K 9/0286 228/32 |
| 5,511,765 A * | 4/1996 | Shippen | ................. | B23K 7/107 266/70 |
| 5,575,971 A * | 11/1996 | Bond | ................. | B23K 37/0235 266/70 |
| 5,596,917 A * | 1/1997 | Gerber | ............... | B65G 21/2036 198/689.1 |
| 5,662,264 A * | 9/1997 | Gustafsson | ........... | B23K 9/028 228/173.6 |
| 5,836,224 A * | 11/1998 | Gerber | ..................... | B26D 7/04 83/451 |
| 6,073,324 A | 6/2000 | Narbeshuber | | |
| 6,129,489 A * | 10/2000 | Linderholm | ......... | B23Q 9/0014 409/178 |
| 6,352,194 B1 | 3/2002 | Larsson | | |
| 2008/0308190 A1* | 12/2008 | Brunson | ................ | B23K 7/107 148/201 |
| 2015/0028083 A1* | 1/2015 | Miller | ................ | B23K 20/1295 228/2.1 |

OTHER PUBLICATIONS

International Search Report and Written Opinion from corresponding International Application No. PCT/EP2018/060860, dated Aug. 3, 2018, 12 pages.

* cited by examiner

300

300

APPARATUS FOR REPAIRING A METAL SHEET METHOD OF OPERATING THE SAME, AND METHOD OF REPAIRING A METAL SHEET

FIELD OF THE DISCLOSURE

The present disclosure relates to an apparatus for repairing a metal sheet and a method of operating the apparatus to repair a metal sheet, for example a metal sheet in a steel belt. In addition, the present disclosure relates to a method of repairing a metal sheet. More particularly, the present disclosure relates to removing damaged areas of a metal, e.g., steel, belt and replacing the damaged area with a new metal piece without requiring edge grinding. The present disclosure further relates to automatic welding operation of the new metal piece. The removal of the damaged area, replacement with new metal piece, and welding occur without moving or repositioning the apparatus.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

FIG. 1 is a side view of a conventional steel belt. FIG. 1 shows a steel belt 100, which includes a steel sheet 110 wrapped in a belt shape around two end drums 120, 130. The end drums 120, 130 rotate synchronously to continuously feed the steel sheet around the end drums 120, 130 to provide a conveyor belt. This type of belt may be referred to as an "endless belt." The steel belt 100 is used in various manufacturing processes and can be very large, for example, several meters wide and tens of meters long.

While in use, defects may occur in the steel sheet 110, e.g., cracks, fractures, or wear, which may be caused by stresses of use, including bending of the steel sheet 110 around the end drums 120, 130. These defects often need to be repaired without removing the entire steel sheet 110. Because of the large size of the steel sheet 110, it is very heavy and would be cumbersome to remove.

One way to repair the defect is to cut a hole around the defect and replace it with a new piece of steel that is then welded into place. Conventionally, this can be done by cutting out an area of a particular size to include the defect, and then replacing the cutout area with a new piece of steel of the same size.

However, in the conventional repair method, the size of the cutout is generally limited, i.e., limited to about 75 cm$^2$, so larger defects cannot be repaired with a single cutout. In addition, in the conventional repair method, a bracing structure is used during the cutting of the damaged area and must be removed before a welding support structure can be placed and the new piece can be put into place, which complicates the process and introduces defects or undesirable results. As a result, the conventional method employees manual welding with a blowtorch, which can be time-consuming. Moreover, the manual welding must be performed twice—once from the top surface of the steel belt 100, and then again from the bottom.

SUMMARY

Accordingly, the present disclosure is directed to an apparatus for repairing a metal sheet and a method of operating the same that substantially obviate one or more of the issues due to limitations and disadvantages of the conventional method.

An object of the present disclosure is to provide an apparatus for repairing a metal sheet including a tool for which a base unit for bracing a metal sheet remains in continuous contact with and/or continuous attachment to the metal sheet throughout a cutting and a welding operation for repairing the metal sheet.

Another object of the present disclosure is to provide an apparatus for repairing a metal sheet for which a cutout area is larger than in the conventional method.

Another object of the present disclosure is to provide an apparatus for repairing a metal sheet that automatically welds a replacement metal disc into a cutout location, alternatively automatically welds a replacement metal disc into a cutout location without any movement or repositioning of the apparatus relative to the repair location on the metal sheet.

Another object of the present disclosure is to provide an apparatus for repairing a metal sheet for which welding is performed from only one side of the metal sheet without requiring welding from the other side.

Additional features and advantages will be set forth in the description that follows, and in part will be apparent from the description, or may be learned by practice of the invention. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, there is provided an apparatus for repairing a metal sheet, including: a base unit including: a frame, a plurality of attachment features attached to a bottom surface of the frame, and a plurality of guide pins attached to the frame, a cutting unit configured to cut out a damaged portion of the metal sheet, the cutting unit including: an axle bar, a motor for providing a rotating cutting force for the cutting unit, a cutting arm under the motor and the axle bar, the cutting arm including at least one cutting blade, and a plurality of cutting unit guide holes on the axle bar, the plurality of cutting unit guide holes respectively corresponding to the plurality of guide pins for removably attaching the cutting unit to the base unit, and a welding unit including: a fixed platform including a plurality of welding unit guide holes, the plurality of welding unit guide holes respectively corresponding to the plurality of guide pins for removably attaching the welding unit to the base unit, a gear ring on the fixed platform, a weld rotation motor for rotating a rotation platform over the gear ring, a drive gear configured to contact the gear ring, the drive gear being further configured to be rotated by the weld rotation motor to rotate the rotation platform over the gear ring, and a welding assembly configured to automatically weld a replacement metal piece to the metal sheet, the welding assembly including a torch configured to perform a weld.

In another aspect, there is provided a method of operating an apparatus for repairing a metal sheet, the method including: determining a repair diameter based on a size of a damaged area of a metal sheet, attaching a base unit directly to a first surface of the metal sheet, over the damaged area, attaching a cutting unit to the base unit, cutting out, by the cutting unit, the damaged area of the metal sheet, removing the cutting unit from the base unit without removing the base unit from the metal sheet, removing the damaged area of the metal sheet while the base unit remains attached to the metal sheet, attaching a backing support to the metal sheet on a second surface of the metal sheet opposite the first surface of the metal sheet to which the base unit is attached, disposing a replacement disc in a repair hole, that remains in the metal sheet after the damaged area is removed, the replacement disc being supported by the backing support such that an upper surface of the replacement disc is level with the first surface of the metal sheet, attaching a welding unit to the base unit, and by the welding unit, automatically welding the replacement disc to the metal sheet.

In another aspect, there is provided an apparatus for repairing a metal sheet, including: a base unit including: a frame, at least one attachment feature attached to the frame, and a plurality of guide pins attached to the frame, a cutting unit removably attachable to the base unit configured to cut out a damaged portion of the metal sheet, the cutting unit including: a cutting arm, the cutting arm including at least one cutting blade, and a motor for operating the cutting arm, and a welding unit removably attachable to the base unit, the welding unit including: a fixed platform, a weld movement motor for moving a moveable platform on the fixed platform, and a welding assembly configured to automatically weld a replacement metal piece to the metal sheet, the welding assembly being attached to the moveable platform.

In another aspect, there is provided a method of operating an apparatus for repairing a metal sheet, the method including: attaching a base unit directly to a surface of a metal sheet, over a damaged area, attaching a cutting unit to the base unit, by the cutting unit, cutting out the damaged area of the metal sheet, removing the cutting unit from the base unit without removing the base unit from the metal sheet, removing the damaged area of the metal sheet while the base unit remains attached to the metal sheet, attaching a welding unit to the base unit, and by the welding unit, automatically welding a replacement disc to the metal sheet.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWING

The accompanying drawings, which are included to provide a further understanding of the invention and are incorporated in and constitute a part of this specification, illustrate implementations of the invention and together with the description serve to explain the principles of the disclosure.

Figure 1:
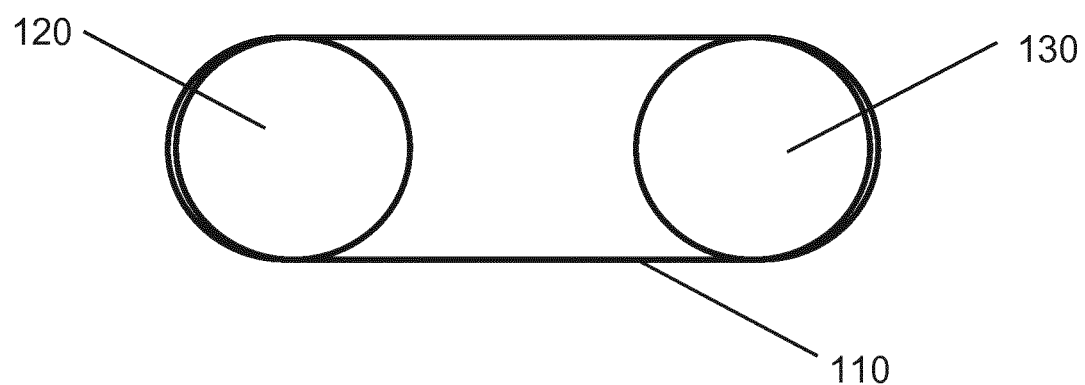
FIG. 1 is a side view of a conventional steel belt.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here. The progression of processing steps and/or operations described is an example; however, the sequence of steps and/or operations is not limited to that set forth herein and may be changed as is known in the art, with the exception of steps and/or operations necessarily occurring in a certain order.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

<Description of Apparatus>

Figure 2A:
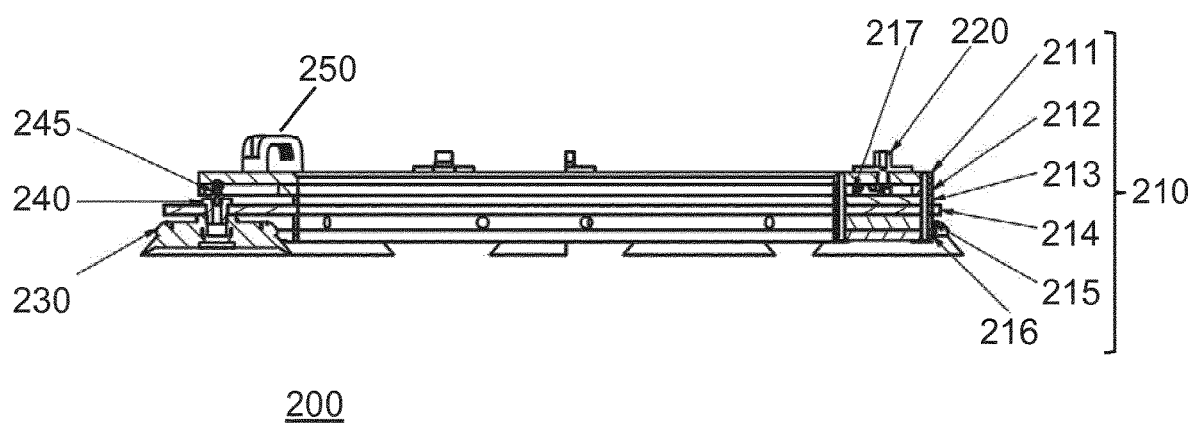
FIG. 2A is a side view of a base unit of an apparatus for repairing a metal sheet according to an example embodiment of the present disclosure.
Figure 2B:
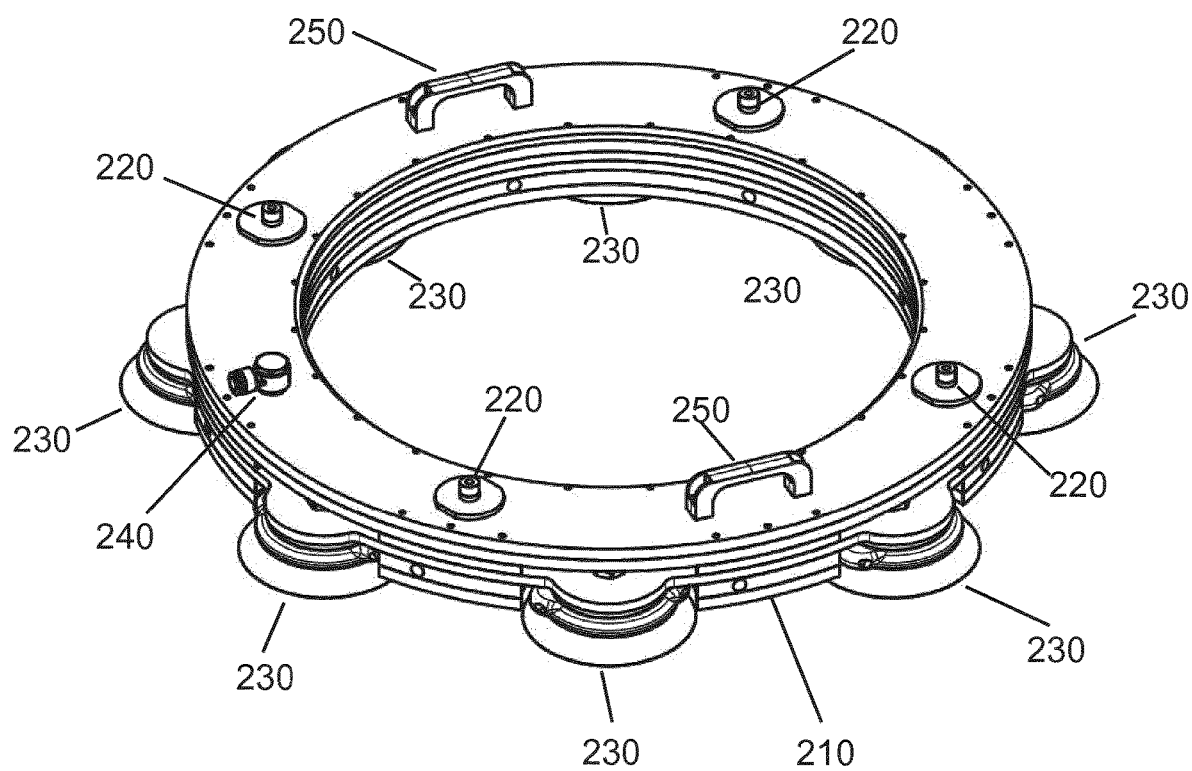
FIG. 2B is a perspective view of the base unit of FIG. 2A.

FIG. 2A is a side view of a base unit of an apparatus for repairing a metal sheet according to an example embodiment of the present disclosure. FIG. 2B is a perspective view of the base unit of FIG. 2A. With reference to FIGS. 2A and 2B, a base unit 200 includes a frame 210. The frame 210 may be, for example, in a circular or ring shape, although embodiments are not limited thereto. The circular or ring shape may allow for the features of the apparatus to be rotated with minimal interference with other features. The circular or ring shape may also be operated with multiple overlaying passes, for example, with more simple radial dimensions, being used to determine and/or track the location of cutting. As another example, the circular or ring shape may allow use of a rotation motor as a simpler engineering design than may be required for other shapes. The circular or ring shape may allow for better stabilization of the steel belt because there are no stress concentration corners, so the result may be improved over other shapes. The diameter of the frame 210 defines a maximum diameter for a repair area, which should be inside the frame 210. In an embodiment, a maximum repair diameter may be 480 mm, although larger maximum repair diameters are contemplated. The repair diameter may be selected, for example, based on the size of the damaged area, to minimize or reduce a repair area, based on available repair material, etc. It should be noted that, within the maximum diameter, smaller diameter repairs may be made. For example, some repair diameters may be 210 mm, 300 mm, 400 mm, 480 mm, etc. In some embodiments, the frame 210 may include multiple layers, e.g., layers 211-216. The layers may be, e.g., aluminum, and may be of a lighter weight than a frame of a solid one-piece construction for ease of carrying by a user. The number of layers is not limited to the illustrated example. The frame 210 may further include an inner ring, e.g., ring 217, inside a circumference of one or more of the layers. The base unit 200 may include a plurality of guide pins 220 for guiding a cutting unit (e.g., cutting unit 300 of FIG. 3A below) and a welding unit (e.g., welding unit 400 of FIG. 4A below) into position over the base unit 210 for use. The guide pins 220 may be disposed between one of the layers 211-216 and the inner ring 217. The layers may also be sized and/or formed to accommodate various other features of the apparatus as described herein, for example, a cutout to accommodate attachment features, various interconnecting fasteners and/or conduits for power, vacuum, and control features, and removal of areas for weight considerations.

It should be noted that, although the example embodiments described herein discuss a circular repair area, other shapes can be used, such as a square, rectangle, triangle, octagon, regular polygon, irregular polygon, freeform shape, etc. If another shape is used for the repair area, the geometry of the repair area, the cutting shape, and the welding pattern would be suitably adjusted, for example, to the geometry of the apparatus and/or repair area, as would be understood to one of ordinary skill in the art.

The base unit 200 includes a plurality of attachment features. The attachment features secure the base unit to the steel belt 110. An example of an attachment feature includes vacuum cups 230. In the example illustrated in FIG. 2B, eight vacuum cups 230 are shown. However, embodiments are not limited thereto. For example, a different type of attachment feature such as an attachment feature using magnetics or adhesives can be utilized, or a combination of such features. Further, the number of attachment features can vary as necessary to securely position the apparatus in the manner discussed herein, e.g., continuously throughout the cutting and welding operations for repairing the metal sheet and such that the metal sheet is in a stable and flat configuration to reduce or minimize warping, while still being able to remove the apparatus when the repair is complete. In other words, in operation, the frame of the base unit is continuously attached to the metal sheet during the cutting of the damaged portion and the welding of the replacement portion, which provides a stable and repeatable frame of reference for operation of the apparatus. In the related art, when the base is removed after cutting to set up for welding, some movement of the underlying metal sheet may cause there to be a poor fit of the replacement piece and the final repaired surface may be less planar than a repaired surface according to an embodiment. In addition, the repeatable frame of reference allows the welding location to be automatically determined based on the cut location, so the automatic welding may be performed without offset.

In an example in which the attachment feature includes vacuum cups, the vacuum cups 230 can be affixed to a metal sheet by vacuum pressure (or suction), and remain in place continuously throughout the cutting and welding operations for repairing the metal sheet. The use of the vacuum cups 230 in a ring shape around the base unit 200 maintains the metal sheet in a stable and flat configuration to reduce or minimize warping of the metal sheet. A vacuum unit (not shown) may be attached to the base unit 200 at a nipple 240 on an angular coupling 245, and the vacuum unit may provide vacuum pressure, e.g., by compressing air. The vacuum pressure may be at a minimum of 6 bar or 600 liters/minute, although embodiments are not limited thereto. For example, the vacuum cups 230 may require a different, e.g., less, vacuum pressure. The base unit 200 may further include one or more handles 250 for positioning and moving the base unit 200 before and after operation of the apparatus. The metal sheet may be, for example, steel, and may be part of a steel belt as described above. However, embodiments are not limited thereto.

Figure 3A:
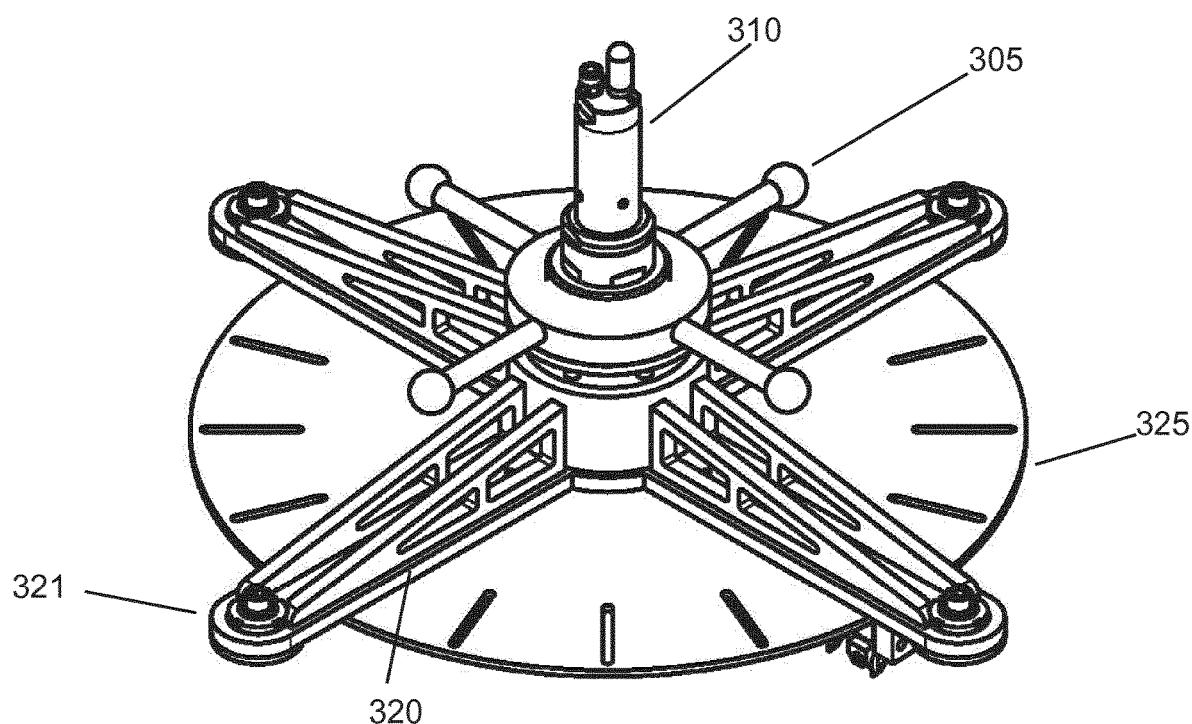
FIG. 3A is a perspective view of a cutting unit of an apparatus for repairing a metal sheet according to an example embodiment of the present disclosure.
Figure 3B:
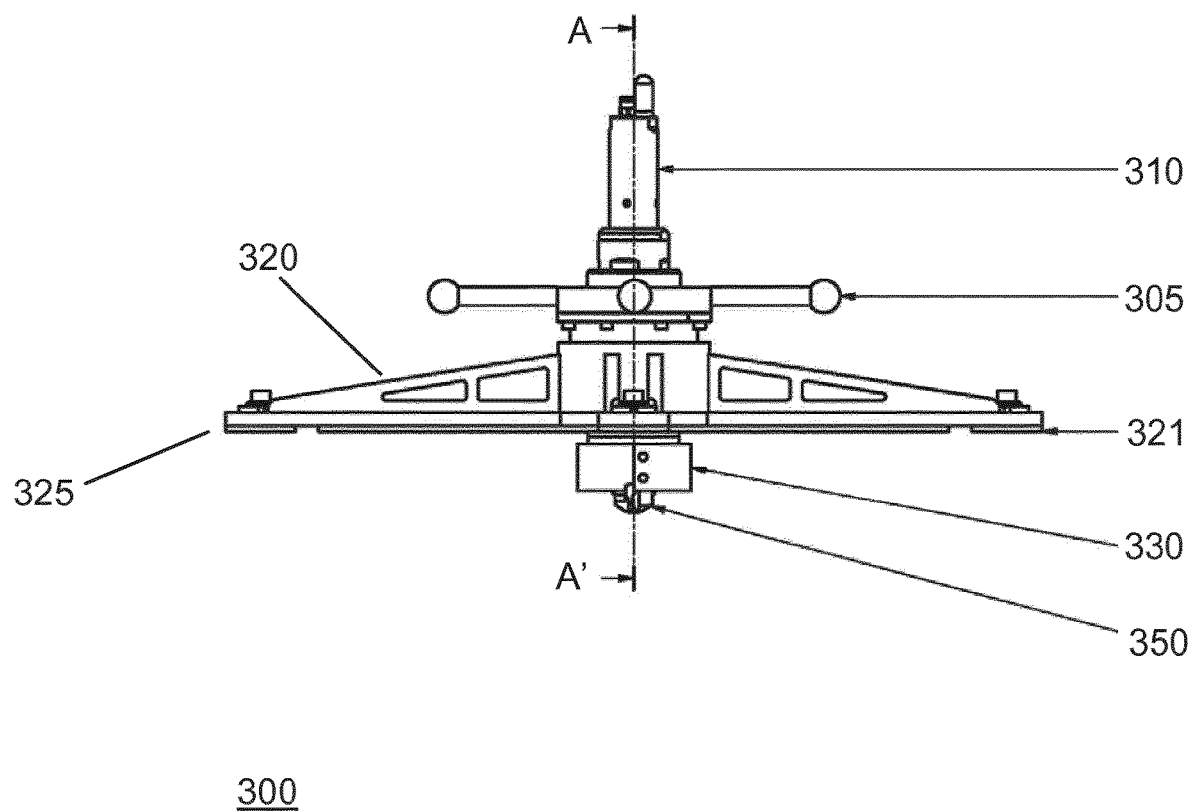
FIG. 3B is a side view of the cutting unit of FIG. 3A.
Figure 3C:
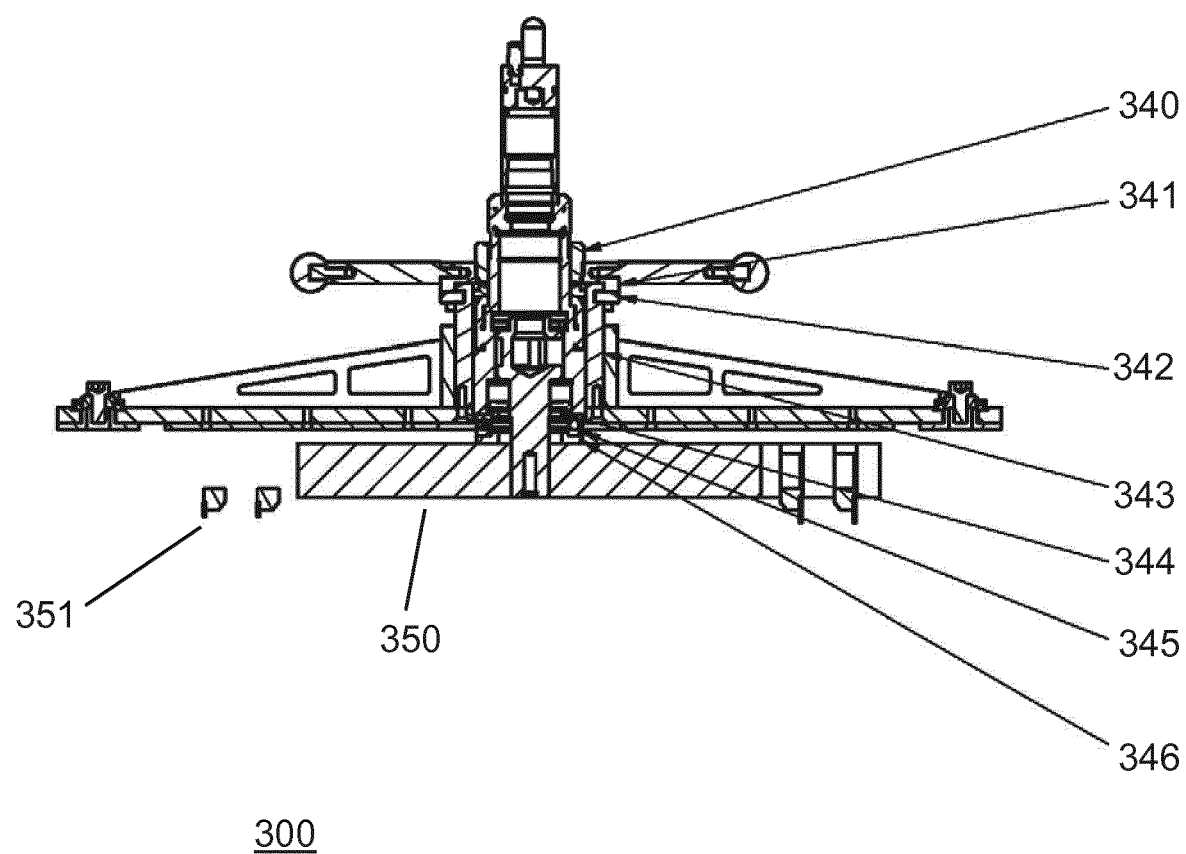
FIG. 3C is a cross-sectional view of the cutting unit of FIG. 3B taken along line A-A'.
Figure 3D:
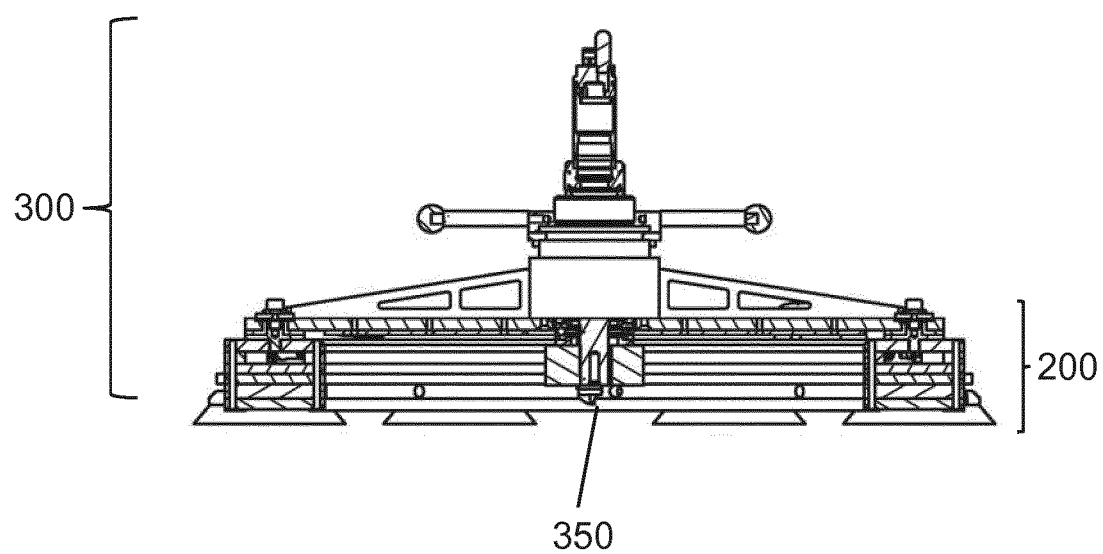
FIG. 3D is a cross-sectional view of an apparatus for repairing a metal sheet, according to an example embodiment of the present disclosure, in a cutting configuration, including the base unit of FIG. 2A and the cutting unit of FIG. 3A.
Figure 3E:
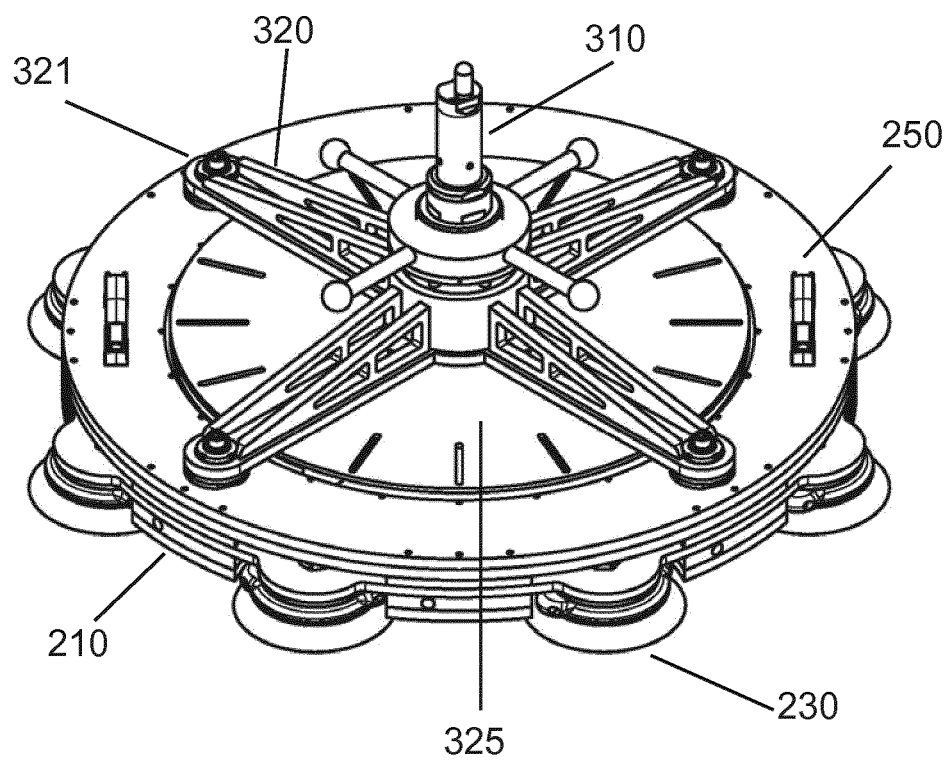
FIG. 3E is a perspective view of the apparatus in a cutting configuration of FIG. 3D.
Figure 3F:
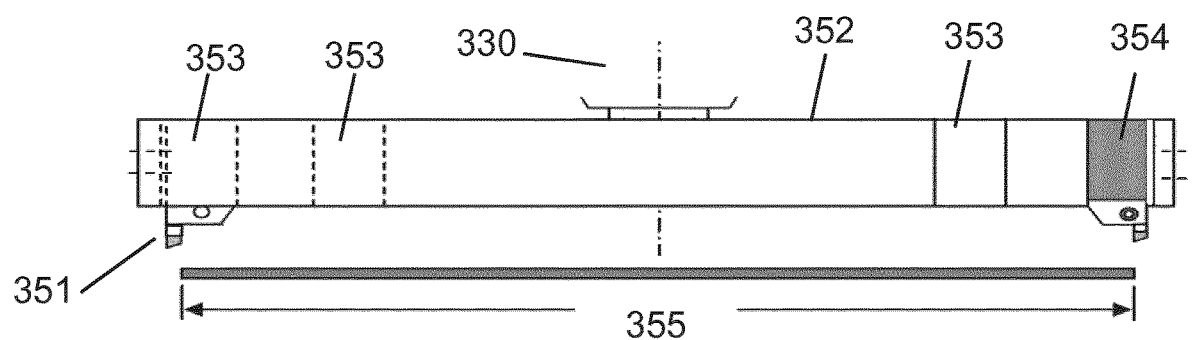
FIG. 3F is a side view of a cutting arm included in the cutting unit of FIG. 3B.

FIGS. 3A to 3F are schematic illustrations of an example embodiment of a cutting unit 300. FIG. 3A is a perspective view of a cutting unit of an apparatus for repairing a metal sheet according to an embodiment of the present disclosure. FIG. 3B is a side view of the cutting unit of FIG. 3A. FIG. 3C is a cross-sectional view of the cutting unit of FIG. 3B taken along line A-A'. FIG. 3D is a cross-sectional view of an apparatus for repairing a metal sheet, according to an embodiment of the present disclosure, in a cutting configuration, including the base unit of FIG. 2A and the cutting unit of FIG. 3A. FIG. 3E is a perspective view of the apparatus in a cutting configuration of FIG. 3D. FIG. 3F is a side view of a cutting arm included in the cutting unit of FIG. 3B.

With reference to FIGS. 3A to 3F, the illustrated cutting unit 300 includes a handle 305 for a user to move or rotate the cutting unit 300, a cutting motor unit 310 above the handle 305 for providing a rotating cutting force for the cutting unit 300, an axle bar 320, a protective cover 325, a cutter holder 330, and a cutting arm 350 that is held by the cutter holder 330. The axle bar 320 includes at least two arms. Although four arms are shown in the FIG. 3A example, embodiments are not limited thereto. Each arm of the axle bar 320 may include a respective cutting unit guide hole 321 that corresponds to and may be disposed in a guide pin (e.g., guide pin 220 of FIG. 2B above) for stably and securely positioning the cutting unit 300 over the base unit 200 for use, as shown in FIG. 3D. For example, each cutting unit guide hole 321 may slide over and surround a respective guide pin 220 to provide lateral stability to the cutting unit 200 when it is disposed over the base unit 200. As illustrated in FIG. 3D, when the cutting unit 300 is secured over the base unit 200, the cutting arm 350 is disposed inside the circumference of the frame 210.

When the cutting unit 300 is secured over the base unit 200, the protective cover 325 substantially covers, e.g., covers at least 90% of the opening, if not completely covers, e.g., covers 100% of, the opening, the inside circumference of the frame 210, e.g., to protect the cutting operation and to reduce an amount of debris, e.g., metal shavings, from the metal sheet from getting outside of the frame 210. The protective cover 325 may include slots or holes, e.g., for venting or visibility. The protective cover 325 may fit inside a circumference defined by the cutting unit guide holes 321. however, if the protective cover 325 does not fit inside the circumference defined by the cutting unit guide holes 321, the protective cover 325 would be disposed above a top surface of the frame 210. When the cutting unit 300 is secured over the base unit 200, the protective cover 325 may be all or partially recessed below a top edge of the frame 210, or may be at or above the top edge of the frame 210. However, the protective cover 325 should not interfere with the cutting operation.

The cutting unit 300 may further include a motor shaft 340 for holding the cutting motor unit 310, a height adjustment ring 341 for adjusting the height of the cutting arm 350, a split ring 342, a hub 343 from which the axle bar 320 may extend, an upper distance bearing 344, an axial bearing 345, and a lower distance bearing 346. One or more cutting blades 351 may be attached to the cutting arm 350 for cutting the metal sheet.

As shown in the FIG. 3F example, the cutting arm 350 may include one or more cutting blades 351. Although two cutting blades are illustrated in FIG. 3F, embodiments are not limited thereto. The cutting blades 351 may be, for example, carbide cutters, although embodiments are not limited thereto. The cutting blades 351 are disposed in a cutting bar arm 352, which may include a respective cutting blade hole 353 in which each cutting blade 351 may be disposed for cutting a disc 355. In FIG. 3F, a cutting blade hole 354 having a cutting blade 351 disposed therein is shaded. The cutting bar arm 352 may include a plurality of cutting blade holes 353 at various distances from the cutter holder 330. The distance of the cutting blade 351 from the cutter holder 330 defines the repair diameter of the disc 355 that will be cut from and replaced in the metal sheet. The cutting blade 351 can be placed in different cutting blade holes 353, depending on the desired diameter to be cut. The cutting arm 350 may be removable, such that different cutting arms 350 may have holes at different distances for different repair diameters. The cutting motor 310 may be driven, e.g., by compressed air, to rotate the cutting arm 350 such that the cutting blades 351 cut into the metal sheet to create the disc 355 that can then be removed from the metal sheet. The cutting arm may be rotated multiple times, with the cutting blades 351 being lowered with each rotation, to cut through the metal sheet. In one embodiment, a cutting blade 351 may be disposed at each end of the cutting arm 350, such that an even downward pressure may provide an even circular cut and may prevent warping of the inner surface of the cutout hole.

Figure 4A:
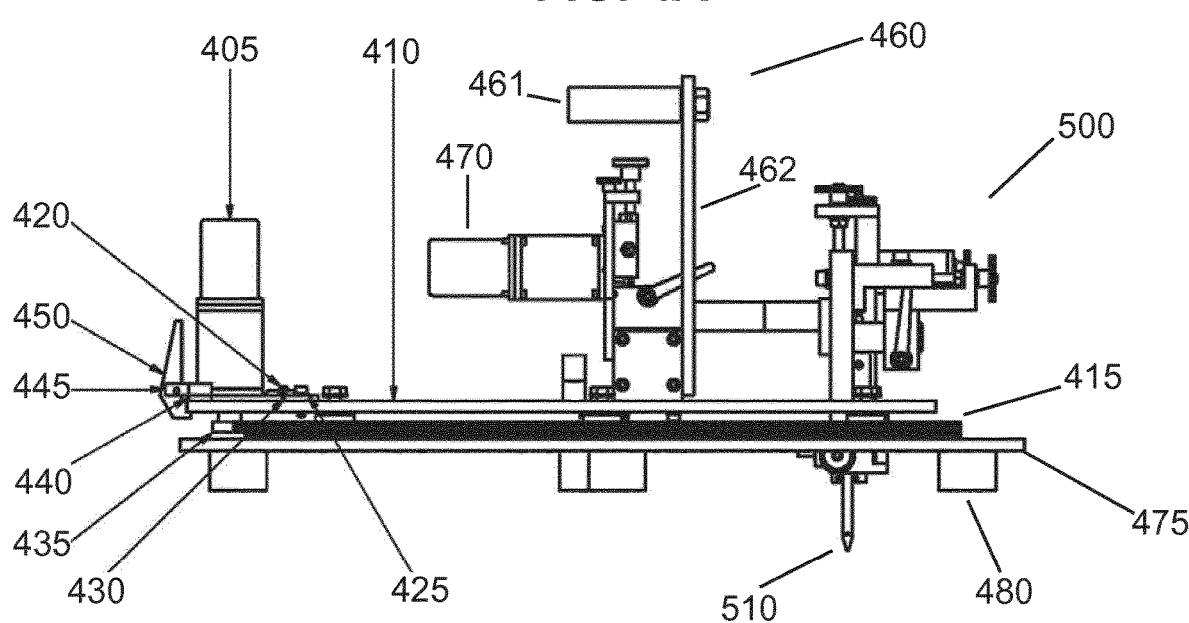
FIG. 4A is a side view of a welding unit of an apparatus for repairing a metal sheet according to an example embodiment of the present disclosure.
Figure 4B:
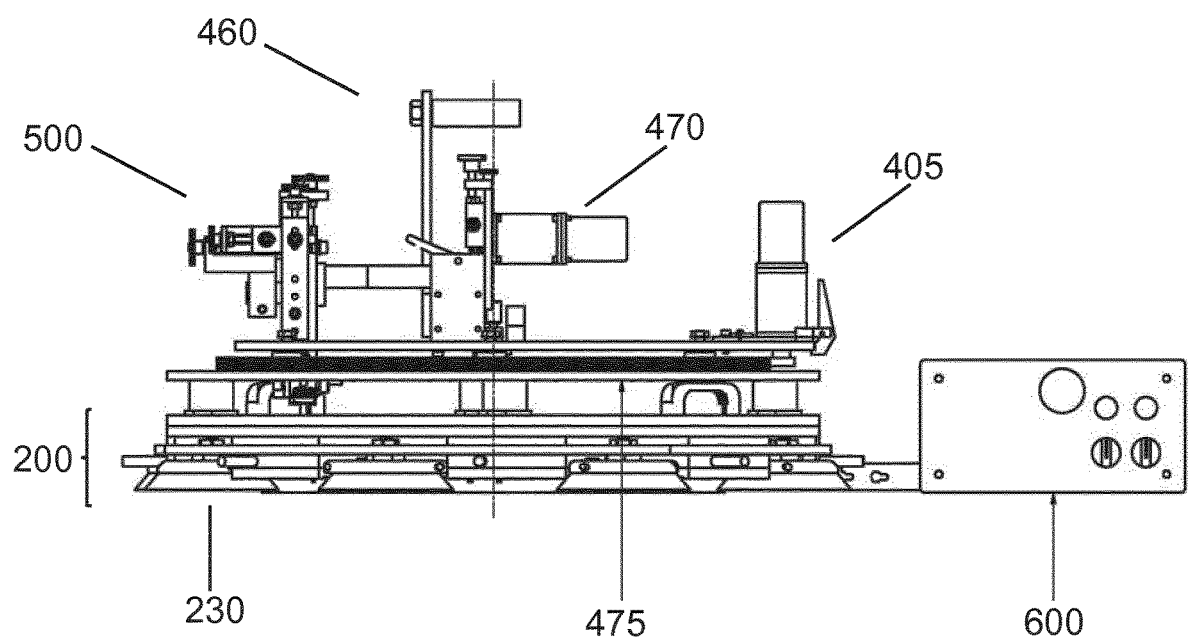
FIG. 4B is a side view of an apparatus for repairing a metal sheet, according to an example embodiment of the present disclosure, in a welding configuration, including the base unit of FIG. 2A and the welding unit of FIG. 4A.
Figure 4C:
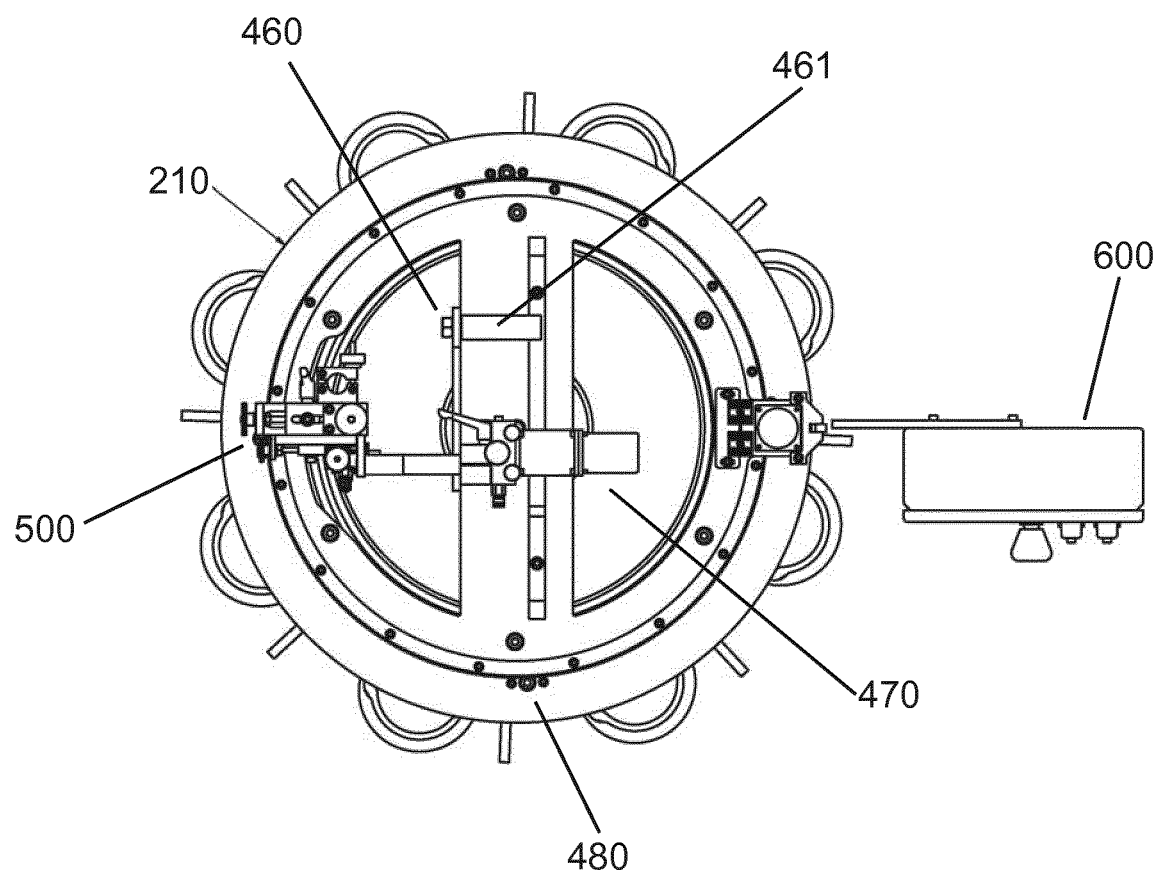
FIG. 4C is a top view of the apparatus in a welding configuration of FIG. 4B.
Figure 4D:
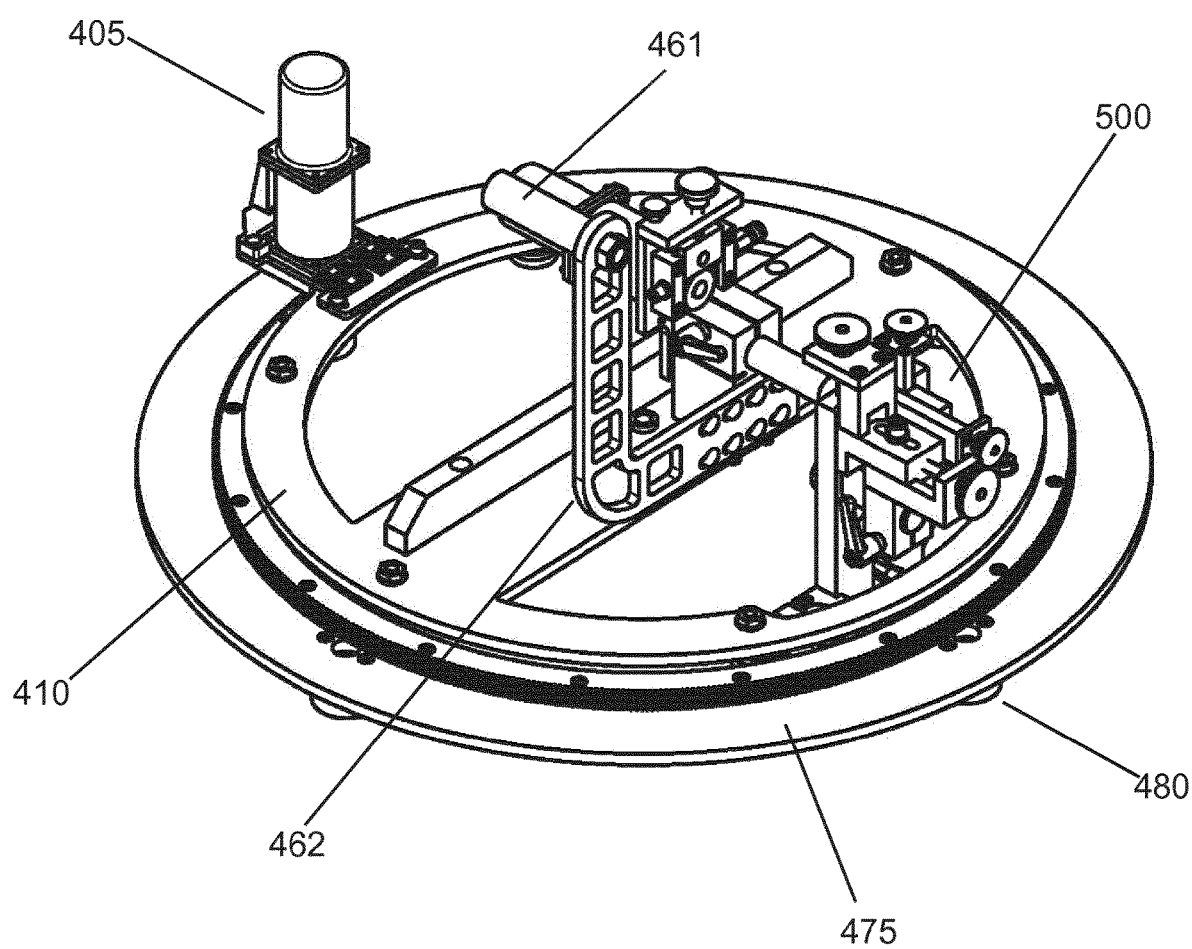
FIG. 4D is a perspective view of the welding unit of FIG. 4A.

FIG. 4A is a side view of a welding unit of an apparatus for repairing a metal sheet according to an embodiment of the present disclosure. FIG. 4B is a side view of an apparatus for repairing a metal sheet, according to an embodiment of the present disclosure, in a welding configuration, including the base unit of FIG. 2A and the welding unit of FIG. 4A. FIG. 4C is a top view of the apparatus in a welding configuration of FIG. 4B. FIG. 4D is a perspective view of the welding unit of FIG. 4A.

With reference to FIGS. 4A-4D, the illustrated welding unit 400 includes a weld rotation motor 405 for rotating a rotation platform 410, which may be disposed on a gear ring 415. The welding unit 400 may further include a hinge 420, a tray 425, a fixed hinge 430, a drive gear 435 for contacting the gear ring 415, a motor mount 440 for holding the weld rotation motor 405, a locking bracket 445, and a side bracket 450. The weld rotation motor 405 may rotate the drive gear 435, which may have gear teeth that interlock with corresponding gear teeth on the gear ring 415 to rotate the rotation platform 410 over the gear ring 415.

A welding assembly 500 may be attached to the rotation platform 410, and may be disposed, e.g., directly opposite to the weld rotation motor 405, although embodiments are not limited thereto. The welding assembly 500 may receive a weld wire from a wire feed 460, which may include a spool holder 461 for holding a spool of welding wire (not shown) and a spool arm 462 that supports the spool holder 461. The welding assembly may be controlled by a welding control unit 600. It should be noted that the position and orientation of the welding control unit 600 is not limited to the configurations in the drawings. The wire feed and welding speed may be automatically controlled by the welding control unit 600. The position of a torch 510 and the position of a wire may be adjusted manually.

The weld rotation motor 405 and the welding assembly 500 may receive power from a power unit 470. The power unit 470 may receive electricity from an energy source, e.g., a wall outlet, portable generator, battery, etc., for example, at 90-220 V alternating current (AC), and provides current drive, e.g., direct current (DC), for powering the weld rotation motor 405 and the welding assembly 500. In one example, the DC power may be 36 V. Embodiments are not limited to these example power values.

The welding unit 400 may include a fixed platform 475 to which the gear ring 415 is attached. The fixed platform 475 may include welding unit guide holes 480 that correspond to and may be disposed on guide pins (e.g., guide pins 220 of FIG. 2B above) for stably and securely positioning the welding unit 400 over the base unit 400 for use, as shown in FIG. 4C. For example, each welding unit guide hole 480 may slide over and surround a respective guide pin 220 to provide lateral stability to the welding unit 400 when it is disposed over the base unit 200.

Figure 5:
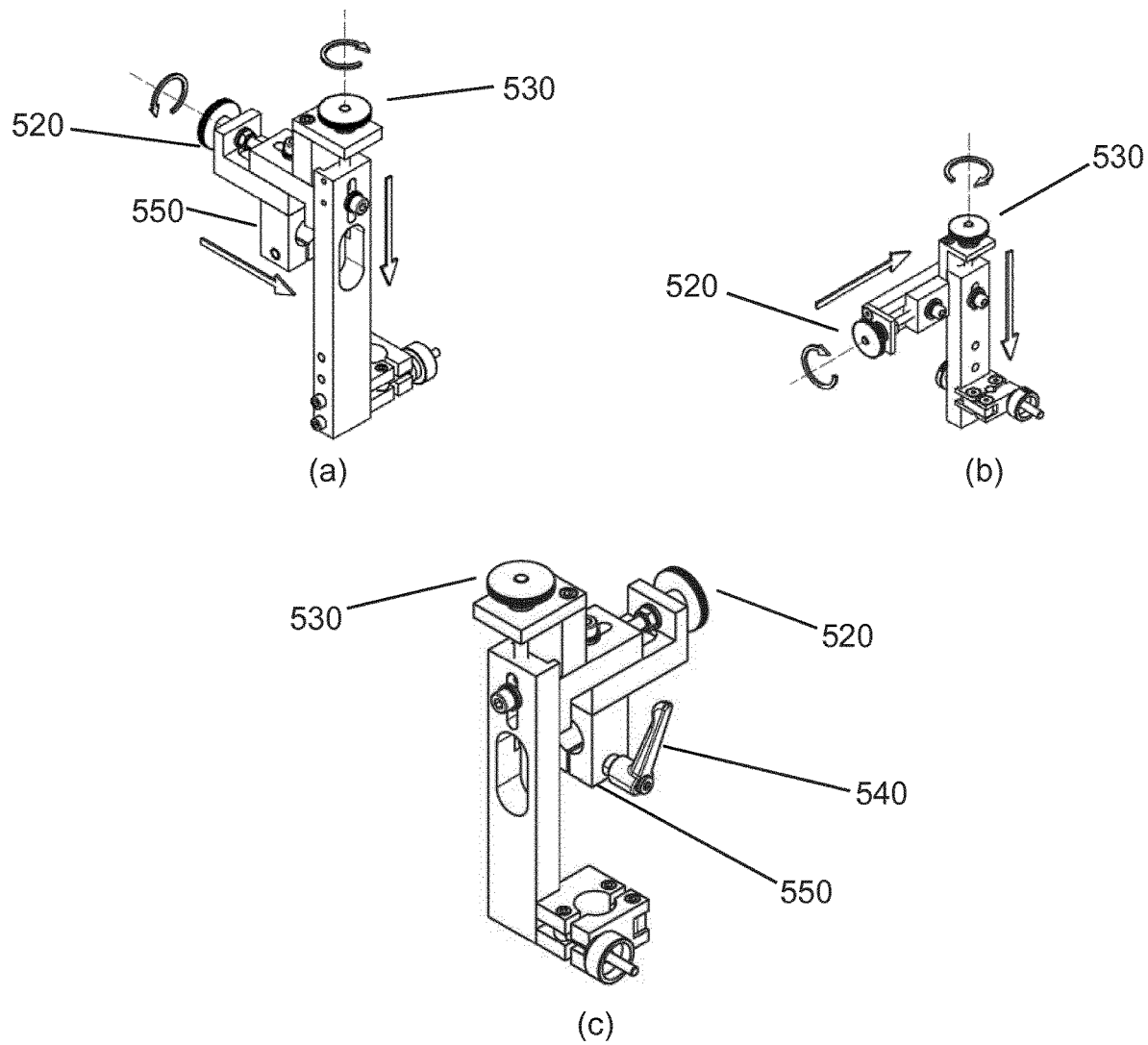
FIG. 5 shows perspective views of a welding assembly included in the welding unit of FIG. 4A.

FIG. 5 shows perspective views of a welding assembly included in the welding unit of FIG. 4A. With reference to FIG. 5, parts (a), (b), and (c) show different perspectives of the welding assembly 500. The illustrated welding assembly 500 includes adjustment knobs 520, 530 for manual adjustment of the torch 510 (see FIG. 4A) and wire positions. In FIG. 5, circular arrows illustrate clockwise rotation for operation of the adjustment knobs 520, 530, although embodiments are not limited thereto. The straight arrows in FIG. 5 illustrate the direction of motion that is available for the torch 510 that occurs based on the adjustment of the respective adjustment knobs 520, 530. Part (c) shows a locking lever 540 for adjusting a clamping associated with a block 550.

Figure 6:
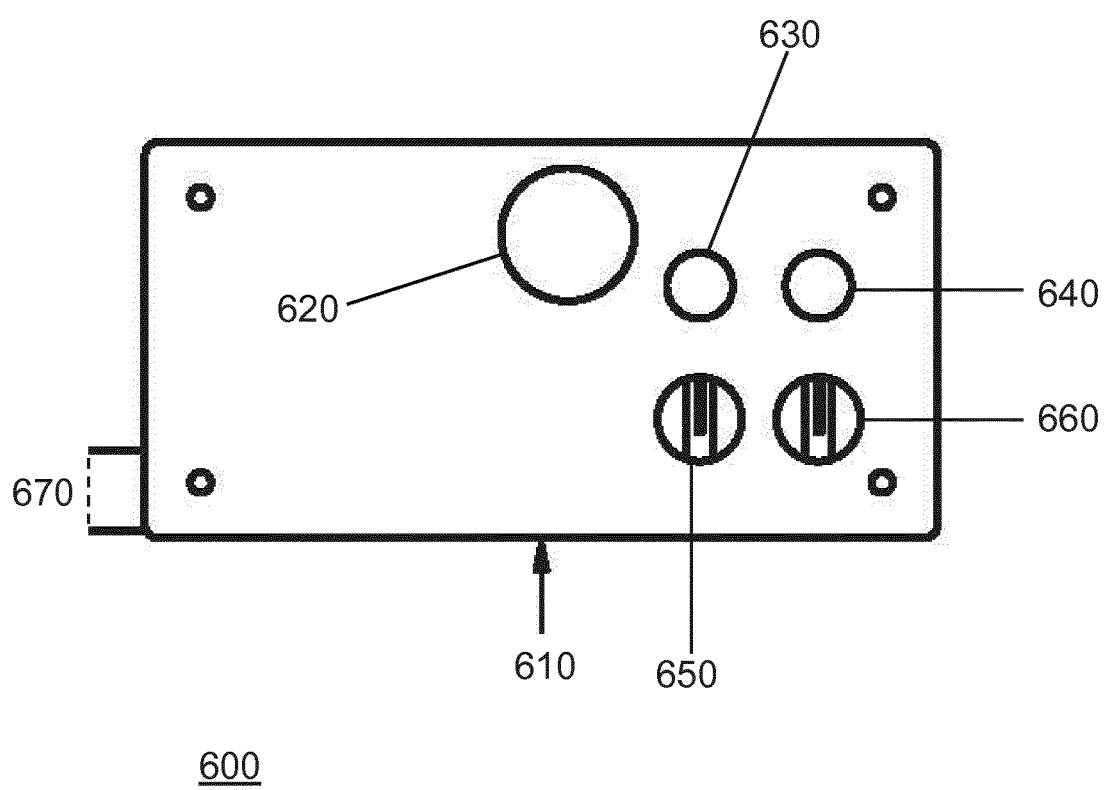
FIG. 6 is a side view of a welding control unit for controlling operation of the welding torch assembly of FIG. 5.

FIG. 6 is a side view of a welding control unit for controlling operation of the welding torch assembly of FIG. 5. With reference to FIG. 6, the illustrated welding control unit 600 includes a housing 610, an emergency stop control 620, a wire speed control 630, a welding assembly rotation speed control 640, a first switch 650 for controlling feed and direction of the weld wire (e.g., in, stop, and out), and a second switch 660 for controlling direction of the motion of the welding assembly 500 (e.g., clockwise, stop, and counterclockwise). The first switch 650 and the second switch 660 may each be a three-way switch. The welding control unit 600 may be electrically connected to the welding assembly 500 via a connection 670. Embodiments of the welding control unit 600 are not limited to these control features.

Figure 7:
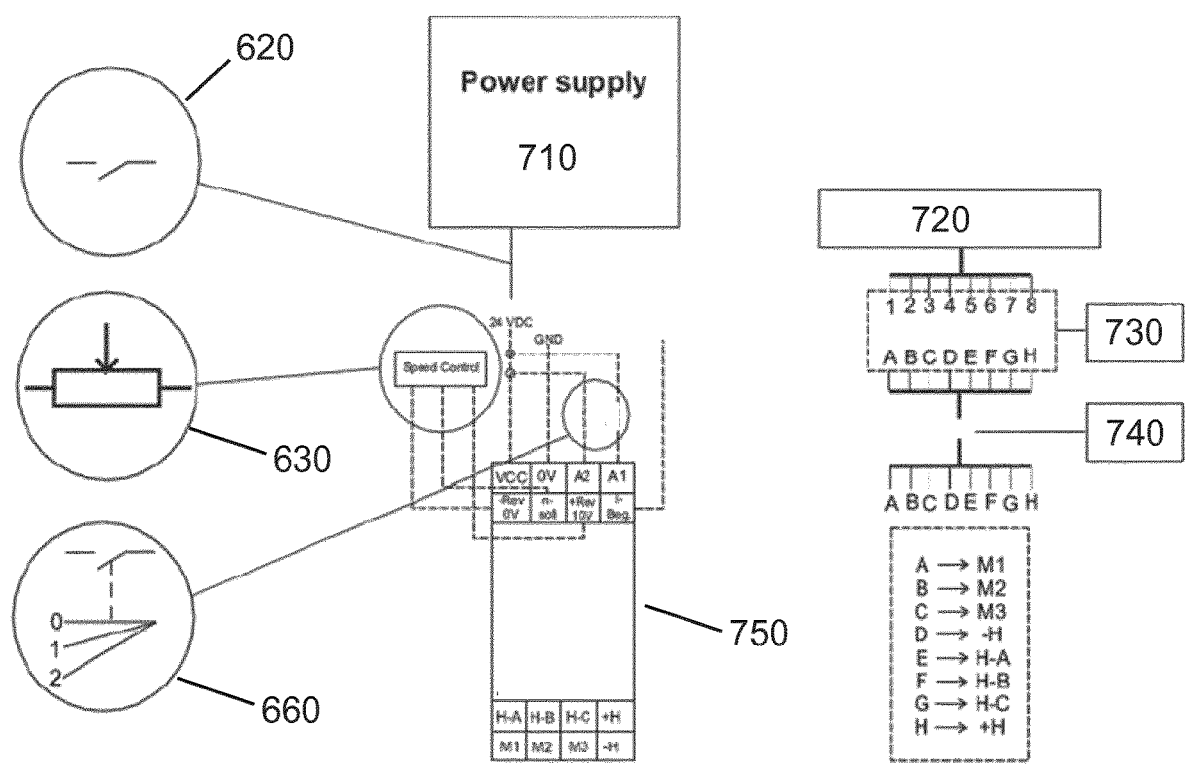
FIG. 7 is a wiring diagram for the welding control unit of FIG. 6.

FIG. 7 is a wiring diagram for the welding control unit of FIG. 6. With reference to FIG. 7, the emergency stop 620 may be electrically connected to a power supply 710 for immediately stopping power from the power supply from reaching the welding assembly 500. The power supply 710 may be the power unit 470 of FIG. 4A, or may be a separate unit. The speed control 630 may be, e.g., a potentiometer for providing speed control for the welding assembly 500. The second switch 660 may be, e.g., a three-way switch for switching between turning power to the welding assembly 500 off, starting forward, (e.g., clockwise) motion of the welding assembly 500, and reversing direction (e.g., counterclockwise) motion of the welding assembly 500. The welding assembly 500 may include a weld motor 720 to which the power (e.g., 36 V DC) is supplied from the power supply 710. The weld motor 720 may be electrically connected to the power supply 710 via a contact 730, which may have corresponding electrical connections via a cable 740 to a connection panel 750. Some example connections are shown in the legend in FIG. 7. Embodiments of the wiring of the welding control unit 600 are not limited to the illustrated example configurations.

<Description of Operation>

Figure 8:
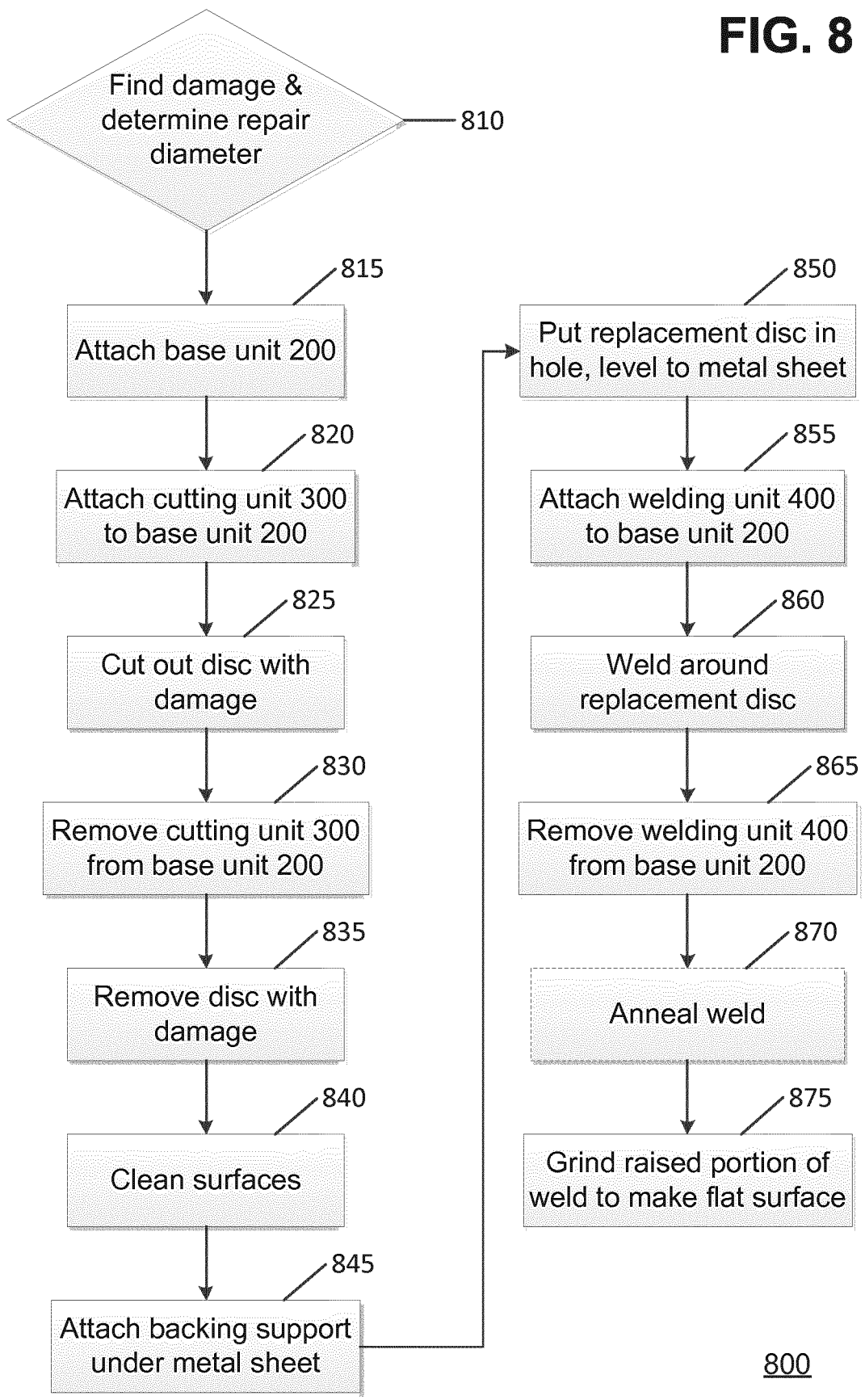
FIG. 8 is a flowchart showing an example method of operating an example apparatus for repairing a metal sheet according to an embodiment of the present disclosure.

FIG. 8 is a flowchart showing a method of operating an apparatus for repairing a metal sheet according to an embodiment of the present disclosure. With reference to FIG. 8, a method 800 may include finding damage to a metal sheet, e.g., on a steel belt, and determining (or choosing) a repair diameter that is at least as large as an area in which the damage has occurred (operation 810). A base unit, e.g., the base unit 200 of FIG. 2A, may be attached to the metal sheet with, for example, one or more attachment features, e.g., the vacuum cups 230 of FIG. 2A (operation 815). The base unit may be attached over the damaged area on one side of the metal sheet. A cutting unit, e.g., the cutting unit 300 of FIG. 3A, may be attached to the base unit (operation 820). A disc corresponding to the selected diameter may be cut out of the metal sheet such that the damaged area is within the cutout (operation 825). The cutting unit may then be removed from the base unit (operation 830).

After the cutting unit is removed from the base unit, the damaged disc may be removed while the base unit remains attached to the metal sheet by the vacuum cups (operation 835). The surface of the hole in the metal sheet made by the cutting operation may be cleaned, for example, burrs may be removed and the inner surface of the hole may be smoothed for receiving a replacement disc (operation 840).

The replacement disc may also be cleaned if not previously done. The replacement disc may be precut to a particular diameter corresponding to the repair diameter, e.g., as a precut blank, or may be made at the time of the repair. The replacement disc may be of the same material as the metal sheet.

Next, a backing support (not shown) may be attached to the metal sheet on an opposite surface (e.g., bottom surface) of the metal sheet from the base unit (operation 845), and the replacement disc may be placed in the hole and supported by the backing support so that the top surface of the replacement disc is level with the top surface of the metal sheet (operation 850).

Subsequently, the welding unit, e.g., the welding unit 400 of FIG. 4A, may be attached to the base unit (operation 855). The welding unit may then automatically weld the replacement disc to the metal sheet (operation 860). In one embodiment, the weld may be performed in one revolution. The welding operation only needs to be performed from one side of the metal sheet, in contrast to the conventional art, which had to be welded twice—once from each side. In addition, the automatic welding of the present disclosure takes less time than the manual welding of the conventional art.

After the welding is complete, the welding unit may be removed from the base unit (operation 865). The base unit and backing support may also be removed at this stage. The base unit may be removed while the welding unit is still attached to the base unit. Optionally, an annealing process may be performed to strengthen the weld (operation 870). Finally, grinding may be performed on any raised portions of the weld to make a flat surface on the repaired metal sheet (operation 875).

Although the present invention has been described in connection with embodiments thereof, it will be appreciated by those skilled in the art that additions, deletions, modifications, and substitutions not specifically described may be made without departure from the spirit and scope of the invention as defined in the appended claims.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus for repairing a metal sheet, comprising:
   a base unit including:
      a frame;
      a plurality of attachment features attached to a bottom surface of the frame; and
      a plurality of guide pins attached to the frame;
   a cutting unit configured to cut out a damaged portion of the metal sheet, the cutting unit including:
      an axle bar;
      a motor for providing a rotating cutting force for the cutting unit;
      a cutting arm under the motor and the axle bar, the cutting arm including at least one cutting blade; and
      a plurality of cutting unit guide holes on the axle bar, the plurality of cutting unit guide holes respectively corresponding to the plurality of guide pins for removably attaching the cutting unit to the base unit; and
   a welding unit including:
      a fixed platform comprising a plurality of welding unit guide holes, the plurality of welding unit guide holes respectively corresponding to the plurality of guide pins for removably attaching the welding unit to the base unit;
      a gear ring on the fixed platform;
      a weld rotation motor for rotating a rotation platform over the gear ring;
      a drive gear configured to contact the gear ring, the drive gear being further configured to be rotated by the weld rotation motor to rotate the rotation platform over the gear ring; and
      a welding assembly configured to automatically weld a replacement metal piece to the metal sheet, the welding assembly comprising a torch configured to perform a weld.

2. The apparatus of claim 1, wherein:
the plurality of attachment features include vacuum cups; and
the base unit further includes a vacuum connector connected to the vacuum cups for receiving a vacuum pressure for attaching the vacuum cups to the metal sheet.

3. The apparatus of claim 1, wherein the welding assemble further comprises at least one manual adjustment control for adjusting a position of the torch and a weld wire.

4. The apparatus of claim 1, further comprising:
a wire feed configured to provide the weld wire to the welding assembly,
wherein the wire feed comprises:
   a spool holder configured to hold a spool of welding wire, and
   a spool arm configured to support the spool holder.

5. The apparatus of claim 1, wherein the welding unit further comprises a welding control unit, comprising:
a housing;
an emergency stop control electrically connected to a power unit;
a wire speed control;
a welding assembly rotation speed control;
a first switch for controlling feed and direction of the weld wire; and
a second switch for controlling direction of rotation of the welding assembly.

6. The apparatus of claim 1, wherein the frame further comprises:
a plurality of layers;
an inner ring disposed inside a circumference of one of the plurality of layers, such that the plurality of guide pins are between the inner ring and the one of the plurality of layers.

7. The apparatus of claim 1, wherein the cutting unit further comprises:
a handle below the cutting motor;
a protective cover configured to substantially cover an inside circumference of the frame to protect the cutting operation; and
a cutter holder configured to hold the cutting arm.

8. The apparatus of claim 1, wherein the cutting unit further comprises:
a motor shaft configured to hold the cutting motor unit;
a height adjustment ring configured to adjust a height of the cutting arm;
a split ring;
a hub from which the axle bar extends;
an upper distance bearing;
an axial bearing; and
a lower distance bearing.

9. The apparatus of claim 1, wherein the cutting arm further comprises:
a cutting bar arm; and
at least one cutting blade hole in the cutting bar arm, the at least one cutting blade hole corresponding to the at least one cutting blade for holding the at least one cutting blade.

10. The apparatus of claim 1, wherein the welding unit further comprises:
a first hinge configured to attach the weld rotation motor to the rotation platform;
a tray configured to attach the weld rotation motor to the rotation platform;
a second hinge configured to attach the weld rotation motor to the rotation platform;
a motor mount configured to hold the weld rotation motor;
a locking bracket attached to the motor mount; and
a side bracket attached to the motor mount.

11. A method of operating the apparatus of claim 1, comprising:
attaching the base unit directly to a first surface of the metal sheet, over the damaged portion of the metal sheet;
attaching the cutting unit to the base unit;
by the cutting unit, cutting out the damaged portion of the metal sheet;
removing the cutting unit from the base unit without removing the base unit from the metal sheet;
removing the damaged portion of the metal sheet while the base unit remains attached to the metal sheet;
attaching a backing support to the metal sheet on a second surface of the metal sheet opposite the first surface of the metal sheet to which the base unit is attached;
disposing a replacement disc in a repair hole, that remains in the metal sheet after the damaged area is removed, the replacement disc being supported by the backing support such that an upper surface of the replacement disc is level with the first surface of the metal sheet;
attaching the welding unit to the base unit;
by the welding unit, automatically welding the replacement disc to the metal sheet;
removing the welding unit from the base unit; and
removing the base unit from the metal sheet.

* * * * *